United States Patent [19]
Akahoshi et al.

[11] Patent Number: 4,970,083
[45] Date of Patent: Nov. 13, 1990

[54] LACTIC ACID FERMENTED FOOD AND METHOD OF MANUFACTURING THE SAME

[75] Inventors: Ryoichi Akahoshi; Yoshiharu Kuma; Akihiko Miyagi; Takahiro Mizobuchi, all of Tokyo, Japan

[73] Assignee: Kabushiki Kaisha Yakult Honsha, Tokyo, Japan

[21] Appl. No.: 414,305

[22] Filed: Sep. 29, 1989

[30] Foreign Application Priority Data

Oct. 4, 1988 [JP] Japan .................................. 63-249122

[51] Int. Cl.$^5$ .......................... A23C 9/12; A23L 1/236
[52] U.S. Cl. ......................................... 426/34; 426/36; 426/40; 426/42; 426/43; 426/52; 426/61; 426/548; 426/580; 426/581; 426/582; 426/583; 426/590
[58] Field of Search ...................... 426/42, 43, 548, 61, 426/34, 36, 40, 580, 581, 582, 583, 590

[56] References Cited

U.S. PATENT DOCUMENTS

| | | | |
|---|---|---|---|
| 4,430,349 | 2/1984 | Malone et al. | 426/43 |
| 4,770,889 | 9/1988 | Sakai et al. | 426/548 |
| 4,837,036 | 6/1989 | Baker et al. | 426/548 |

*Primary Examiner*—Marianne Cintins
*Attorney, Agent, or Firm*—Oblon, Spivak, McClelland, Maier & Neustadt

[57] ABSTRACT

A lactic acid fermented food is sweetened using aspartame alone or a sweetening agent containing aspartame. The lactic acid bacteria which are used to manufacture the lactic acid fermented food and which remain in same are those selected from group A consisting of: *Streptococcus cremoris, Streptococcus lactis, Streptococcus diacetilactis, Streptococcus thermophilus, Pedicoccus cerevisiae* and *Leuconostoc cremoris*, and are never those selected from group B consisting of: *Lactobacillus bulgaricus* and *Lactobacillus helveticus*.

4 Claims, No Drawings

LACTIC ACID FERMENTED FOOD AND METHOD OF MANUFACTURING THE SAME

BACKGROUND OF THE INVENTION

The present invention relates to a lactic acid fermented food sweetened by aspartame and a method of manufacturing same.

DESCRIPTION OF THE RELATED ART

Recently, greater attention has been drawn to the intake of an appropriate number of calories in one's diet from the viewpoint of maintenance of health. As a result, an effort has been made to reduce amounts of high calory saccharine sweeteners such as sugar, glucose or fructose used in various types of foods, which are likely to bring an excessive number of calories with ingestion.

The amount of sweetening agent used in a food may be reduced without deteriorating the texture of that food by substituting any low-calorie or non-caloric sweetening agent having a strong sweetening power (e.g., stevioside, aspartame, glycyrrhizins and so on) for part or all of the saccharine sweeteners used. However, these sweetening agents having a strong sweetening power are different from sugar in their qualities of sweetness, and the quality of sweetness of a sweetening agent differs depending on the food in which it is used. So, research has been done on the most suitable sweetening agent and usage thereof for each of various foods.

The selection of a suitable sweetening agent has also been researched with respect to the lactic acid fermented foods which are often sweetened, such as fermented milk or lactic acid beverages, and it has been revealed that aspartame is one of the most favorable sweeteners in terms of the quality of sweetness when used to sweeten these lactic acid fermented foods which taste sour because of lactic acid bacteria.

However, it has also been found that the sweetness of aspartame, which is used in the lactic acid fermented foods to sweeten them, decreases over a short period of time. As is generally known, aspartame readily decomposes in the state of a solution. It is stable only in a low-temperature weak acid state. Factors other than temperature and pH can also cause instability of aspartame. It is considered that instability observed in aspartame added to lactic acid fermented foods is the result of the breakdown of originally unstable aspartame accelerated by the lactic acid fermented product.

Conventionally, aspartame is used in lactic acid fermented foods in the manner described below: Aspartame is added to the food when the food has been sufficiently cooled after completion of lactic acid fermentation in an amount larger than necessary because of the decrease in sweetness which occurs by the time it is consumed. Alternatively, the lactic acid fermented foods sweetened by aspartame are kept at as low a temperature as possible during distribution. In particular, in the case of fermented milk, the addition of aspartame before lactic acid fermentation starts has been considered impossible because aspartame decomposes to a large degree during the fermentation process, which lasts long at a high temperature.

SUMMARY OF THE INVENTION

The present invention is directed to eliminate the aforementioned problems involving the use of aspartame as a sweetening agent in lactic acid fermented foods, and an object thereof is to provide a lactic acid fermented food in which the sweetness of aspartame does not decrease much with time and in which deterioration in texture caused by the reduction in the sweetness is reduced.

Another object of the present invention is to provide a sweetened low-caloric lactic acid fermented food.

Another object of the present invention is to provide a method of manufacturing a lactic acid fermented food which enables lactic acid fermentation in which aspartame added to a fermentation material before lactic acid fermentation starts does not decompose to a large degree, and which enables aspartame to be used in lactic acid fermented food (e.g., set yogurt) of the type in which addition of a sweetening agent or the like after completion of lactic acid fermentation is difficult.

To this end, the present invention provides a lactic acid fermented food which is sweetened using aspartame alone or a sweetening agent containing aspartame and which is devoid of Lactobacillus. The lactic acid bacteria which are used in a major amount to manufacture the lactic acid fermented food and which remain in it are those selected from group A consisting of: *Streptococcus cremoris, Streptococcus lactis, Streptococcus diacetilactis, Streptococcus thermophilus, Pediococcus cerevisiae* and *Leuconostoc cremoris*, and are never those selected from group B consisting of: *Lactobacillus bulgaricus*, and *Lactobacillus helveticus*.

The present invention also provides a method of manufacturing a lactic acid fermented food sweetened by adding a sweetener before fermentation. The lactic acid fermented food manufacturing method includes the steps of sweetening a fermentation material by adding aspartame to it before lactic acid fermentation, and by introducing a lactic acid starter to the fermentation material to cause lactic acid fermentation, the lactic acid starter being mainly lactic acid bacteria selected from group A and never those selected from group B.

DETAILED DESCRIPTION OF THE INVENTION

The present inventors examined various types of lactic acid fermented foods and found that decomposition of aspartame added to the lactic acid fermented food largely depends on the type of lactic acid used in the manufacture of that food. More specifically, under the conditions in which the storage temperature and pH were suitable to aspartame, aspartame decomposed to a great extent when certain types of lactic acid bacteria were used for fermentation, whereas decomposition of aspartame did not substantially occur when other types of lactic acid bacteria were used (of course, there were cases in which the degree of decomposition of aspartame was between these two cases). Decomposition of aspartame added to the lactic acid fermented food after heating and sterilization is not affected by the type of lactic acid bacteria. In that case, aspartame does not decompose readily. It is therefore clear that lactic acid bacteria participates in the decomposition of aspartame in some way, and that the degree of decomposition of aspartame differs depending on the type of lactic acid bacteria.

Although the mechanism of accelerating decomposition of aspartame, the degree of which differs depending on the type of lactic acid bacteria is not known fully, the lactic acid bacteria selected from group A do not accelerate the decomposition of aspartame. The lactic acid bacteria selected from group B are very effective in decomposing aspartame. In consequence, decomposition of aspartame, which would occur during the fermentation or distribution of the products, can be held to a minimum (substantially to the same degree as in an aqueous solution of weak acid) by using mainly the lactic acid bacteria selected from group A and never using those selected from group B in fermentation.

The lactic acid fermented food of the present invention may be manufactured in the conventional method with the exception that the lactic acid bacteria selected in the above-described manner is used for fermentation and that the food is sweetened using aspartame alone or a sweetening agent containing aspartame. However, it is to be noted that the care normally required to handle unstable aspartame should also be taken in the manufacture of the lactic acid fermented food according to the present invention. In the manufacture of fermented milk, where aspartame is added to the milk before fermentation, it is preferable for the aspartame to be added to it concurrently with or after the addition of a starter. In this way, aspartame is not held in solution for a long time in the neutral, heated material milk which has not yet fermented, and decomposition thereof can be therefore avoided. Streptococcus group lactic acid bacteria are particularly suitable as the lactic acid bacteria to be used together with the food which is sweetened by aspartame before fermentation starts, because they produce lactic acid in a short period of time after fermentation has started and thereby reduce the pH of the food to provide a weak acid state in which aspartame does not readily break down.

*Lactobacillus casei, Lactobacillus acidophilus, Lactobacillus plantarum* or *Lactobacillus brevis* may also be used together with the lactic acid bacteria selected from group A each in a small amount in the manufacture of lactic acid fermented food according to the present invention. Aspartame is not decomposed by any of these types of lactic acid bacteria to the degree that it is decomposed by any of those selected from group B, so the stability of aspармate is not deteriorated to a large extent when the above-described types of lactic acid bacteria are used together with the lactic acid bacteria selected from group A for fermentation.

The present invention can be applied to processed food such as fermented milk, lactic acid beverages, dairy product lactic acid beverages, koumiss, kefir, fermented butter, quark cheese, fresh cheese, brewed food, pickles and so on, as well as to the method of manufacturing such foods.

As stated above, according to the present invention, aspartame can be used in the lactic acid fermented food without its sweetening power being decreased or the texture of the food being changed which may be otherwise caused by the decomposition of aspartame. This results in the provision of a low-calorie delicious lactic acid fermented food effectively sweetened by a smaller amount of aspartame. Furthermore, since aspartame can be added to a lactic acid fermented food before lactic acid fermentation, aspartame can be used in lactic acid fermented foods of the type which cannot be conventionally sweetened by aspartame due to the difficulty involving sweetening of the food after fermentation.

DETAILED DESCRIPTION OF THE PREFERRED EMBODIMENT

An experimental example and working examples of the manufacture of lactic acid fermented food will be described below.

EXPERIMENTAL EXAMPLE 1

How the decomposition of aspartame in fermented milk was accelerated by the presence of various types of lactic acid bacteria was examined. If both lactic acid bacteria and aspartame are added to a culture medium of milk which has not yet fermented having a pH of 6.5 to 6.7, breakdown of aspartame which is not related to the lactic acid bacteria may occur. So, in these experiments, aspartame was added to milk which was lactic fermented in the manner described later and acidified, and this fermented milk with aspartame was heated to kill the lactic fermenting bacteria. Experimental lactic acid bacteria were then added to the fermented milk with aspartame to obtain a sample.

Sterilized fermented milk with aspartame was prepared in the manner described below: liquid *Streptococcus thermophilus* was introduced and cultivated in 25 % recombined skimmed milk to obtain a culture having a pH of about 4.0. 3.00 g of aspartame was dissolved in water, and the pH of this aqueous solution was adjusted to about 4.5 by citric acid. Thereafter, this solution was diluted to 3500 ml, and the resultant solution was heated for sterilization for 5 minutes at 100 ° C. to obtain a syrup. 40 g of high methoxyl pectin was dissolved in water to prepare a solution of 2750 ml. 3750 ml of culture, 3500 ml of syrup and 2750 ml of pectin solution were mixed with each other. After the mixture was homogenized by a homogenizer, it was sterilized by a UHT sterilizer to obtain a sample.

A test was conducted in the manner described below: A lactic acid bacteria culture prepared with milk as a culture medium (which contains bacteria at a density of $10^9$/ml or above) was added to the sterilized fermented milk with aspartame which was prepared in the manner described above in an amount which ensured that the fermented milk contained 1 % of lactic acid bacteria culture. After the fermented milk was stored for a predetermined period of time at a predetermined temperature, the rate of decomposition of aspartame contained in the fermented milk was examined.

The above-described test was conducted on the various types of fermented milk prepared using various types of lactic acid bacteria. Table 1 shows the results of the tests.

TABLE 1

Relationship between Rate of Decomposition of Aspartame and Type of Lactic Acid

| Type of Lactic Acid | At *1 × 24 H | Storage Conditions 15° C. × 4 W | 10° C. × 4 W |
|---|---|---|---|
| S. cremois IAM1150 | 2% (25° C.) | 5% | 1% |
| S. lactis IAM1198 | 3% (30° C.) | 9% | 2% |
| S. diacetilactis (*2) | 3% (30° C.) | 8% | 1% |
| S. thermophilus IAM1047 | 3% (40° C.) | 13% | 2% |
| P. cerevisiae IAM1233 | 1% (30° C.) | 2% | 1% |
| Leuc. cremoris ATCC19254 | 1% (25° C.) | 2% | 1% |
| L. bulgaricus IFO3533 | 95% (40° C.) | 96% | 81% |
| L. helveticus IAM1042 | 96% (40° C.) | 95% | 82% |
| L. acidophilus IFO3205 | 14% (40° C.) | 95% | 35% |
| L. casei IFO3245 | 12% (30° C.) | 96% | 30% |
| L. plantarum IAM1041 | 8% (30° C.) | 80% | 21% |
| S. thermophilus + S. cremoris | 2% (25° C.) | 12% | 2% |
| S. thermophilus + S. lactis | 3% (30° C.) | 14% | 2% |
| S. thermophilus + P. cerevisiae | 3% (30° C.) | 14% | 2% |
| S. thermophilus Leuc. cremoris | 2% (25° C.) | 12% | 2% |
| S. thermophilus + | 99% (40° C.) | 98% | 85% |

TABLE 1-continued

Relationship between Rate of Decomposition of Aspartame and Type of Lactic Acid

| Type of Lactic Acid | Storage Conditions | | |
|---|---|---|---|
| | At *1 × 24 H | 15° C. × 4 W | 10° C. × 4 W |
| L. bulgaricus S. thermophilus + L. helveticus | 99% (40° C.) | 99% | 86% |
| S. thermophilus + L. acidophilus | 13% (40° C.) | 95% | 34% |
| S. thermophilus + L. asei | 12% (30° C.) | 95% | 31% |
| S. thermophilus + L. plantarum | 9% (30° C.) | 82% | 23% |
| S. thermophilus + S. lactis + S. cremoris | 3% (30° C.) | 14% | 3% |

(*1) normal cultivating temperature is indicated in parenthesis
(*2) Christian Hansen (Copenhagen)
S. = Streptococcus P. = Pediococcus Leuc. = Leucnostoc
L. = Lactobacillus

EXAMPLE 1

320 g of skimmed milk and 60 g of glucose were dissolved in water to obtain an aqueous solution of 2000 ml. The solution was then heated for 60 minutes for sterilization at 100° C. Thereafter, a starter of *Streptococcus thermophilus* was introduced and cultivated in the solution to obtain a culture having a pH of about 3.9. 8 g of aspartame was dissolved in water. After pH of the solution was adjusted to 4.0 by citric acid, the culture was diluted in up to 4000 ml. The entire culture was then heated for 5 minutes at 100° C. for sterilization to obtain a syrup. 45 g of hydro methoxyl pectin was dissolved in water to obtain a solution of 4000 ml. The solution was then heated for 5 minutes at 100° C. for sterilization to obtain pectin solution.

Thereafter, the culture, the syrup, the pectin solution, and a small amount of spice were mixed with each other, and the solution was then homogenized by a homogenizer to obtain a lactic acid beverage. After the thus-obtained beverage was stored at 10° C., aspartame contained in the product was determined. The rate of decomposition of aspartame (relative to the amount of aspartame added) was 0 % immediately after the manufacture, 3 % on the 7th day after the manufacture, and 5 % on the 14th day after the manufacture.

EXAMPLE 2

8000 ml of 16.5 % reconstituted whole milk was heated for 3Q minutes at 100° C. 2000 ml of a sterilized aqueous solution of aspartame containing 3 g of aspartame (whose pH was adjusted to 4.0 by citric acid) was added to the whole milk to obtain a culture medium. A starter of *Streptococcus thermophilus* was introduced and cultivated at 37° C. until the pH became 4.2 to produce set fermented milk.

After this fermented milk was stored at 10° C., aspartame contained in the produce was determined. The rate of decomposition of aspartame was 4 % immediately after the manufacture, 6 % on the 7th day after the manufacture, and 8 % on the 14th day after the manufacture.

EXAMPLE 3

A starter of *Streptococcus thermophilus* was introduced and cultivated in a culture medium of 2.5 % recombined skimmed milk to obtain a culture having a pH of about 4.5. 3 g of aspartame was dissolved in water. After the pH of the solution was adjusted to 4.0 by citric acid, it was diluted in up to 3500 ml. The solution was then heated for 5 minutes at 100° C. for sterilization to obtain a syrup. 45 g of high methoxyl pectin was dissolved in water to obtain an aqueous solution of 2750 ml. The solution was then heated for 10 minutes at 100° C. for sterilization to obtain a pectin solution.

Next, 3750 ml of culture, 3500 ml of syrup, 2750 ml of pectin solution, and a small amount of spice were mixed with each other, and the resultant mixture was then homogenized by a homogenizer to manufacture a soft drink type fermented milk. After the product was stored at 10° C., aspartame contained in the product was determined. The rate of decomposition of aspartame was 0 % immediately after the manufacture, 2 % on the 7th day after the manufacture, and 4 % on the 14th day after the manufacture.

EXAMPLE 4

A starter of *Streptococcus lactis* and rennet were added to 20 % reconstituted whole milk to obtain a curd of 10000 ml. This curd was cut to remove 3000 ml of whey. 1250 ml of cream (containing 40 % of milk fat) was heated for 30 minutes at 100° C. for sterilization. 100 g of strawberry juice and 4 g of aspartame were dissolved in water to obtain a solution of 1750 ml. The solution was then heated for 5 minutes at 100° C. to obtain a syrup.

Next, 7000 ml of curd, 1250 ml of cream, 1750 ml of syrup, and a small amount of spice were mixed with each other, and the mixture was then homogenized by a homogenizer to obtain fresh cheese.

After the fresh cheese was preserved at 10° C., aspartame contained in the product was determined. The rate of decomposition of aspartame was 0 % immediately after the manufacture, 2 % on the 7th day after the manufacture, and 4 on the 14th day after the manufacture.

What is claimed is:

1. A lactic acid fermented food devoid of *Lactobacillus bulgaricus* or *Lactobacillus helveticus* which comprises a lactic acid fermented food sweetened with aspartame alone or a sweetening agent containing aspartame wherein the lactic acid bacteria which are used to manufacture said lactic acid fermented food and which remain in the same and which are used as the major amount of the lactic acid bacteria are those selected from the group consisting of:

*Streptococcus cremoris, Streptococcus lactis, Streptococcus diacetilactis, Streptococcus thermophilus, Pediococcus cerevisiae* and *Leuconostoc cremoris.*

2. A method of manufacturing a sweetened lactic acid fermented food devoid of *Lactobacillus bulgaricus* or *Lactobacillus helveticus* which comprises adding to a fermentation material, aspartame and
    a lactic acid starter which is used as the major amount of lactic acid bacteria, said starter lactic acid bacteria being selected from the group consisting of *Streptococcus cremoris, Streptococcus lactis, streptococcus diacetilactis, Streptococcus thermophilus, Pediococcus cerevisiae* and *Leuconostoc cremoris,* and fermenting said material so as to cause lactic acid fermentation.

3. A method of manufacturing a lactic fermented food according to claim 2, wherein aspartame is added concurrently with or after the addition of said starter.

4. A method of manufacturing a lactic acid fermented food according to claim 2, wherein aspartame is added before fermentation starts.

* * * * *